United States Patent
Dan-Jumbo et al.

(10) Patent No.: US 8,802,213 B2
(45) Date of Patent: *Aug. 12, 2014

(54) TAPERED PATCH FOR PREDICTABLE BONDED REWORK OF COMPOSITE STRUCTURES

(71) Applicant: The Boeing Company, Chicago, IL (US)

(72) Inventors: Eugene A. Dan-Jumbo, Bothell, WA (US); Russell L. Keller, Maple Valley, WA (US); Everett A. Westerman, Auburn, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/902,855

(22) Filed: May 27, 2013

(65) Prior Publication Data

US 2013/0260077 A1  Oct. 3, 2013

Related U.S. Application Data

(62) Division of application No. 12/400,561, filed on Mar. 9, 2009, now Pat. No. 8,540,909.

(51) Int. Cl.
| | | |
|---|---|---|
| *B64C 1/06* | (2006.01) | |
| *B32B 3/10* | (2006.01) | |
| *B23P 19/04* | (2006.01) | |
| *B29C 73/14* | (2006.01) | |
| *B32B 19/04* | (2006.01) | |
| *B29C 73/10* | (2006.01) | |
| *B29C 73/16* | (2006.01) | |

(52) U.S. Cl.
CPC ............. *B29C 73/14* (2013.01); *B29C 73/10* (2013.01); *B29C 73/16* (2013.01); *B32B 19/04* (2013.01)

USPC ............ 428/63; 428/54; 428/64.1; 29/407.1; 244/133

(58) Field of Classification Search
CPC ...... G11B 5/73; G11B 5/7315; Y02T 50/433; B64F 5/0081; B29K 2105/246; B29K 2063/00; B32B 19/04; B32B 3/263; B32B 3/10; B29L 2031/3076; B29C 73/32; B29C 73/14; B29C 73/16; B29C 73/10
USPC ............ 156/94, 98, 286, 382, 158, 285, 139; 428/411.1, 212, 63, 64.1, 214, 218, 428/139; 361/117, 218; 138/99; 244/133; 29/407.1

See application file for complete search history.

(56) References Cited

U.S. PATENT DOCUMENTS

| | | |
|---|---|---|
| 3,995,080 A | 11/1976 | Cogburn et al. |
| 4,352,707 A | 10/1982 | Wengler et al. |

(Continued)

FOREIGN PATENT DOCUMENTS

| | | |
|---|---|---|
| EP | 1775445 A2 | 4/2007 |
| EP | 1972429 A2 | 9/2008 |

(Continued)

OTHER PUBLICATIONS

Office Action, dated Nov. 7, 2013, regarding U.S. Appl. No. 13/902,816, 26 pages.

(Continued)

*Primary Examiner* — Kevin M. Bernatz
*Assistant Examiner* — Louis Falasco
(74) *Attorney, Agent, or Firm* — Yee & Associates, P.C.

(57) ABSTRACT

A patch for reworking an inconsistent area in a composite structure includes a composite laminate patch adapted to cover the inconsistent area and bonded to the structure by a layer of adhesive. The patch includes a plurality of composite plies having a tapered cross section, and at least first and second regions respectively having differing fracture toughnesses.

20 Claims, 9 Drawing Sheets

(56) References Cited

U.S. PATENT DOCUMENTS

| | | | |
|---|---|---|---|
| 4,497,404 A | 2/1985 | Lowrance | |
| 4,588,626 A | 5/1986 | Cologna et al. | |
| 4,808,253 A | 2/1989 | Mimbs | |
| 4,820,564 A | 4/1989 | Cologna et al. | |
| 4,824,500 A | 4/1989 | White et al. | |
| 4,858,853 A | 8/1989 | Westerman et al. | |
| 4,912,594 A * | 3/1990 | Bannink et al. | 361/218 |
| 4,916,880 A | 4/1990 | Westerman, Jr. | |
| 4,961,799 A | 10/1990 | Cologna et al. | |
| 4,967,799 A | 11/1990 | Bradshaw et al. | |
| 4,978,404 A | 12/1990 | Westerman, Jr. | |
| 5,023,987 A | 6/1991 | Wuepper et al. | |
| 5,034,254 A | 7/1991 | Cologna et al. | |
| 5,190,611 A | 3/1993 | Cologna et al. | |
| 5,207,541 A | 5/1993 | Westerman et al. | |
| 5,214,307 A | 5/1993 | Davis | |
| 5,232,962 A | 8/1993 | Dershem et al. | |
| 5,344,515 A | 9/1994 | Chenock, Jr. | |
| 5,492,466 A * | 2/1996 | Frailey | 156/382 |
| 5,601,676 A | 2/1997 | Zimmerman et al. | |
| 5,618,606 A * | 4/1997 | Sherrick et al. | 156/286 |
| 5,620,768 A | 4/1997 | Hoffmann, Sr. | |
| 5,626,934 A | 5/1997 | Brewer | |
| 5,709,469 A | 1/1998 | White et al. | |
| 5,732,743 A * | 3/1998 | Livesay | 156/158 |
| 5,868,886 A | 2/1999 | Alston et al. | |
| 5,882,756 A | 3/1999 | Alston et al. | |
| 5,993,934 A | 11/1999 | Reese et al. | |
| 6,149,749 A | 11/2000 | McBroom | |
| 6,206,067 B1 | 3/2001 | Kociemba et al. | |
| 6,265,333 B1 | 7/2001 | Dzenis et al. | |
| 6,468,372 B2 | 10/2002 | Kociemba et al. | |
| 6,472,758 B1 | 10/2002 | Glenn et al. | |
| 6,656,299 B1 | 12/2003 | Grosskrueger et al. | |
| 6,680,099 B1 | 1/2004 | Brewer | |
| 6,758,924 B1 | 7/2004 | Guijt | |
| 6,761,783 B2 | 7/2004 | Keller et al. | |
| 7,325,771 B2 | 2/2008 | Stulc et al. | |
| 7,398,698 B2 | 7/2008 | Griess et al. | |
| 7,404,474 B2 | 7/2008 | Yamaki et al. | |
| 7,628,879 B2 | 12/2009 | Ackerman | |
| 7,935,205 B2 | 5/2011 | Bogue et al. | |
| 8,263,212 B2 | 9/2012 | Care | |
| 8,409,384 B2 | 4/2013 | Dan-Jumbo et al. | |
| 8,449,703 B2 | 5/2013 | Dan-Jumbo et al. | |
| 8,524,356 B1 * | 9/2013 | Dan-Jumbo et al. | 156/94 |
| 2001/0008161 A1 | 7/2001 | Kociemba et al. | |
| 2003/0075259 A1 * | 4/2003 | Graham | 156/94 |
| 2003/0188821 A1 * | 10/2003 | Keller et al. | 156/94 |
| 2005/0022923 A1 * | 2/2005 | Korchnak et al. | 156/94 |
| 2005/0053787 A1 * | 3/2005 | Yamasaki et al. | 428/411.1 |
| 2006/0011435 A1 | 1/2006 | Yamaki et al. | |
| 2006/0029807 A1 | 2/2006 | Peck | |
| 2006/0060705 A1 | 3/2006 | Stulc et al. | |
| 2006/0198980 A1 | 9/2006 | Westerdahl | |
| 2006/0243860 A1 | 11/2006 | Kismarton | |
| 2007/0095457 A1 | 5/2007 | Keller et al. | |
| 2007/0100582 A1 | 5/2007 | Griess et al. | |
| 2007/0289692 A1 | 12/2007 | Bogue et al. | |
| 2009/0053406 A1 | 2/2009 | Ackerman | |
| 2010/0047541 A1 | 2/2010 | Care | |
| 2010/0227105 A1 | 9/2010 | Dan-Jumbo et al. | |
| 2010/0227106 A1 | 9/2010 | Dan-Jumbo et al. | |
| 2010/0227117 A1 | 9/2010 | Dan-Jumbo et al. | |
| 2010/0233424 A1 | 9/2010 | Dan-Jumbo et al. | |

FOREIGN PATENT DOCUMENTS

| | | | | |
|---|---|---|---|---|
| WO | 2008119942 | * | 10/2008 | B29C 70/36 |
| WO | WO2010104676 A1 | | 9/2010 | |
| WO | WO2010104741 A1 | | 9/2010 | |
| WO | WO2010104745 A1 | | 9/2010 | |
| WO | WO2010104746 A1 | | 9/2010 | |

OTHER PUBLICATIONS

Office Action, dated Jan. 5, 2012, regarding USPTO U.S. Appl. No. 12/400,519, 21 pages.
Final Office Action, dated Jun. 7, 2012, regarding USPTO U.S. Appl. No. 12/400,519, 14 pages.
Notice of Allowance, dated Oct. 18, 2012, regarding USPTO U.S. Appl. No. 12/400,519, 20 pages.
International Search Report, dated Jun. 25, 2010, regarding USPTO Application No. PCT/US2010/025181 (WO2010104676), 3 pages.
International Search Report, dated May 21, 2010, regarding Application No. PCT/US20101026229 (WO2010104741), 3 pages.
International Search Report, dated Jun. 29, 2010, regarding Application No. PCT/US2010/026252 (WO2010104745), 3 pages.
International Search Report, dated Jun. 29, 2010, regarding Application No. PCT/US2010/026256 (WO2010104746), 7 pages.
Baker, "Repair Techniques for Composite Structures," In: Composite Materials in Aircraft Structures, Middleton (Ed.), Longman, Jan. 1, 1990, pp. 207-227.
Office Action, dated Dec. 22, 2011, regarding USPTO U.S. Appl. No. 12/400,475, 15 pages.
Office Action, dated Jul. 14, 2011, regarding USPTO U.S. Appl. No. 12/401,541, 13 pages.
Final Office Action, dated Dec. 16, 2011, regarding USPTO U.S. Appl. No. 12/401,541, 10 pages.
Office Action, dated May 23, 2013, regarding USPTO U.S. Appl. No. 12/903,489, 15 pages.
Dan-Jumbo et al., "Predictable Bonded Rework of Composite Structures Using Tailored Patches," USPTO U.S. Appl. No. 13/902,816 and Preliminary Amendment, filing date May 26, 2013, 76 pages.
Dan-Jumbo et al., "Bonded Patch Having Multiple Zones of Fracture Toughness," USPTO U.S. Appl. No. 13/945,475 and Preliminary Amendment, filed Jul. 18, 2013, 68 pages.

* cited by examiner

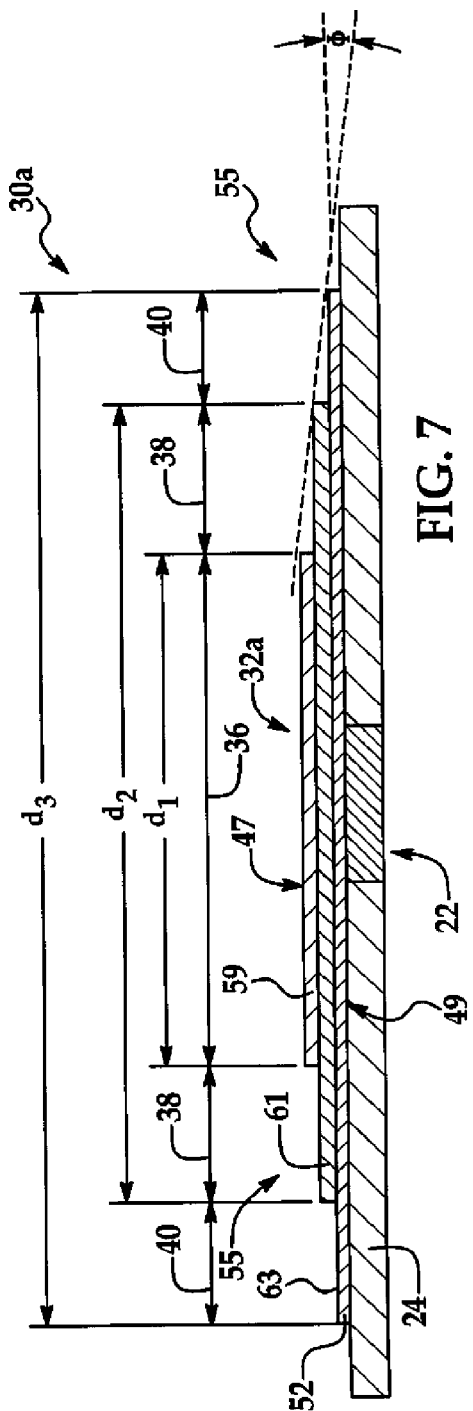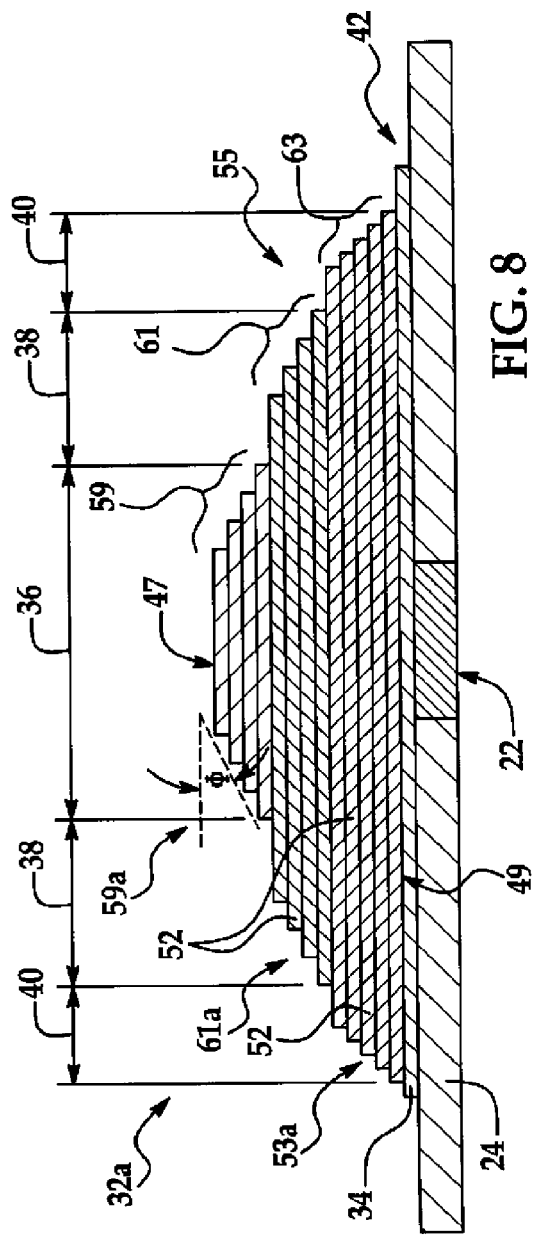

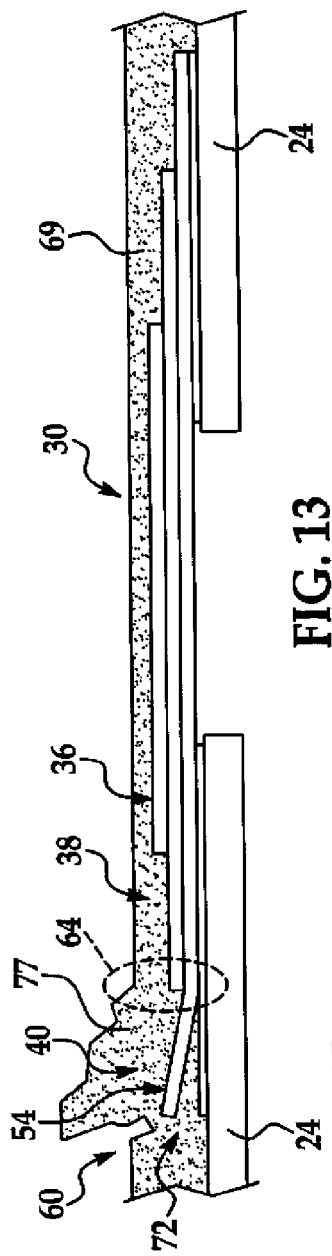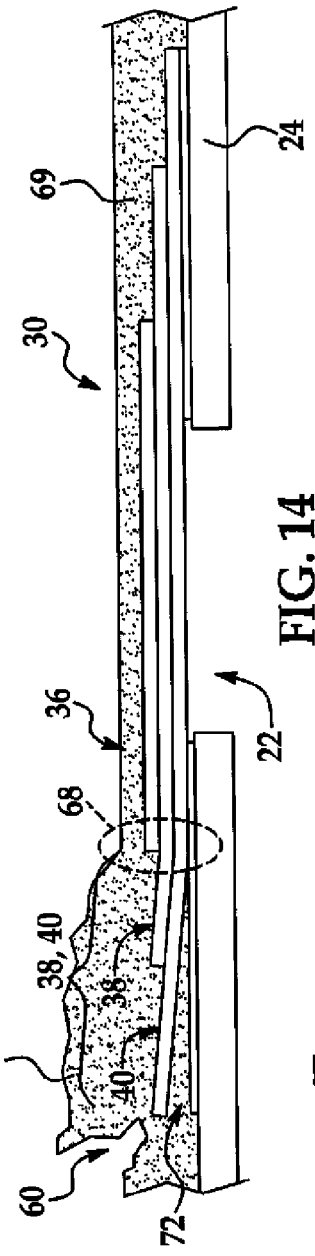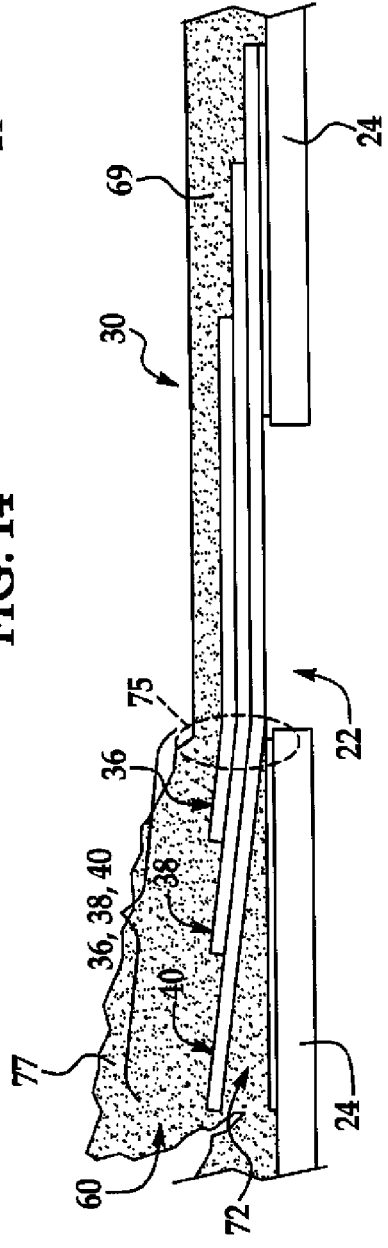

TAPERED PATCH FOR PREDICTABLE BONDED REWORK OF COMPOSITE STRUCTURES

CROSS REFERENCE TO RELATED APPLICATIONS

This application is a divisional of application Ser. No. 12/400,561, filed Mar. 9, 2009, status pending. This application is related to co-pending U.S. patent application Ser. No. 12/400,519, filed on Mar. 9, 2009, and co-pending U.S. patent application Ser. No. 12/400,475, filed on Mar. 9, 2009 both of which applications are filed concurrently herewith on and are incorporated by reference herein in their entireties.

TECHNICAL FIELD

This disclosure generally relates to composite structures, and deals more particularly with a method and composite patch for reworking areas of composite structures containing inconsistencies.

BACKGROUND

Composite structures sometimes have localized areas containing one or more inconsistencies that may require rework in order to bring the structure within design tolerances.

In the past, one rework process was performed using a patch that was placed over the inconsistent area and secured to the parent structure using mechanical fasteners. This rework technique was desirable because the condition of the patch could be monitored over time by visually inspecting the fasteners. However, the use of fasteners may increase aircraft weight and/or drag on the aircraft, and may be esthetically undesirable in some applications.

In some applications, rework patches have been secured to a parent structure using a bonded joint, however this technique may also require the use of mechanical fasteners that provide secondary load paths forming an arrestment mechanism to limit the growth of an inconsistency. Furthermore, changes in a bonded joint securing a rework patch on a parent structure may not be easily monitored over time because the attaching mechanism of the joint or joint interface may not be visible.

Accordingly, there is a need for a rework patch and method of reworking inconsistent areas of composite structures, while allowing the condition of the reworked area to be monitored over time using visual or other types of non-destructive inspection techniques.

SUMMARY

The disclosed embodiments provide a rework patch and method of reworking composite structures using a bonded rework patch without the need for mechanical fasteners. The rework patch includes features that allow visual inspection of the condition of the reworked area over time and permit reliable prediction of future bond joint changes. Because the condition of the reworked area may be visually inspected and predictions made about future bond condition, the bonded rework patch and visual inspection technique may allow certification of the rework by aircraft certifying authorities.

According to one disclosed embodiment, a patch is provided for reworking an inconsistent area in a composite structure. The patch comprises a composite laminate patch adapted to cover the inconsistent area, and a layer of adhesive for bonding the laminate patch to the composite structure. The laminate patch includes a plurality of composite plies having a tapered cross section, and including first and second regions respectively having a differing fracture toughness. The first and second regions of the patch may be defined by first and second groups of plies wherein the edges of the plies in each of the groups form a tapered cross section. In one embodiment, the laminate patch includes a third region having a fracture toughness different than the fracture toughness' of the first and second regions. The first and second regions may be substantially contiguous and concentrically disposed relative to each other. A layer of adhesive may have a thickness that tapers from the outer edges of a layer to a central region of the layer.

According to another embodiment, a patch is provided for reworking an inconsistent area in a composite structure comprising a composite laminate patch and a layer of adhesive for bonding the laminate patch to the composite structure. The laminate patch includes at least first and second groups of composite laminate plies respectively defining first and second regions having differing interlaminar fracture toughnesses. The width of the first group of plies is greater than the width of the second groups of plies, and each group of plies may have tapered edges. The plies in each of the first and second groups may have differing layup orientation sequences and/or differing numbers of plies.

According to still another embodiment, a rework of an inconsistent area in a composite structure comprises a tapered edge on the composite structure surrounding the inconsistent area, and a tapered composite patch covering the inconsistent area. The tapered edge on the structure includes first and second tapered surfaces respectively having first and second scarf angles. The patch includes a nudge having first and second tapered portions respectively bonded to the first and second tapered surfaces of the composite structure. In one embodiment, the tapered edge of the composite structure includes a third tapered surface having a third scarf angle, and the edge of the tapered patch includes a third portion bonded to the third tapered surface of the composite structure edge. The composite patch includes at least first and second groups of composite laminate plies respectively defining first and second regions having differing interlaminar fracture toughnesses.

According to a disclosed method embodiment, an area containing an inconsistency in a composite structure is reworked. The method includes tapering an edge of the structure surrounding the area of the inconsistency, including forming at least first and second scarf angles on the edge. A composite patch is formed having a tapered edge. A bonded scarf joint is formed between the tapered edge of the patch and the tapered edge of the composite structure. Forming the composite patch may include first and second taper angles on the edge of the patch respectively corresponding to the first and second scarf angles on the edge of the structure.

The disclosed embodiments satisfy the need for a bonded composite rework patch and method of rework that allow rework of an inconsistent area in a composite structure, in which the condition of the rework can be visually monitored, and any change of the bonded joint may be predicted based on the visual inspection.

BRIEF DESCRIPTION OF THE ILLUSTRATIONS

FIG. 7 is a sectional illustration of a tapered patch bonded to a parent structure in an area containing an inconsistency.

FIG. 8 is an illustration similar to FIG. 7 but showing the individual plies of the patch and a layer of adhesive forming a bond joint.

FIGS. 13-15 are illustrations of sectional views showing progression of the debonding through regions of the tapered patch.

DETAILED DESCRIPTION

Figure 1:
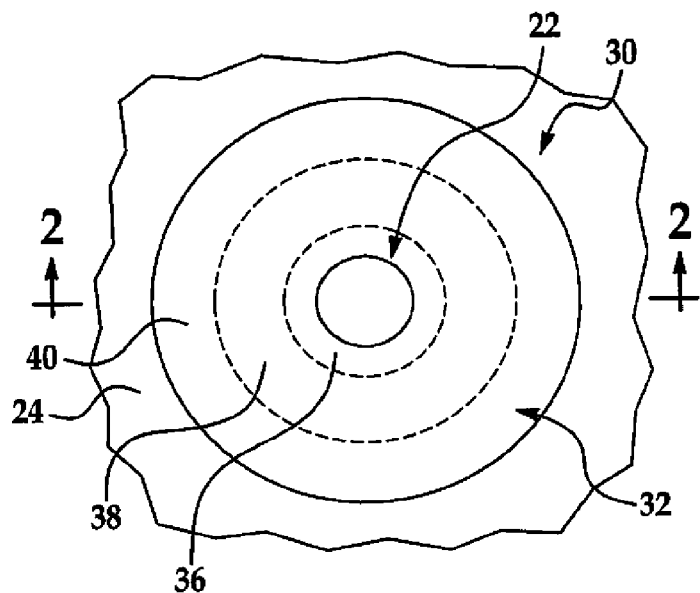
FIG. 1 is an illustration of a bonded rework patch on a composite structure.
Figure 2:
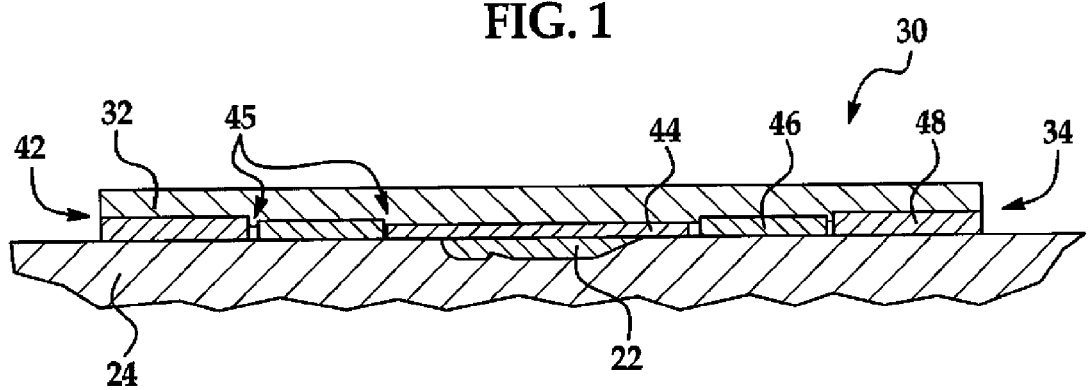
FIG. 2 is an illustration of a sectional view taken along the line 2-2 in FIG. 2.

Referring now to FIGS. 1 and 2, according to the disclosed embodiments, a composite rework patch 30 is used to rework an inconsistent area 22 in a composite structure 24. As used herein, "inconsistent area", "inconsistency" and "inconsistencies" each refer to a localized area in the composite structure 24 that may be outside of designed tolerances. The inconsistency 22 may comprise, for example and without limitation, a void, a dent, or a porosity that may occur at the time that the composite structure 24 is manufactured, or later during the service life of the composite structure 24.

The composite patch 30 comprises a composite laminate patch 32 which overlies the inconsistent area 22 and is bonded to the composite structure 24 by a layer 34 of a structural adhesive forming a bond joint 42. The size of the patch 30 may vary with the application and the dimensions of the inconsistent area 22. The adhesive layer divides the bonded joint 42 and area 22 into first, second and third control regions 36, 38, 40 respectively, that may provide a graceful reduction of transition loads transmitted between the structure 24 and the patch 30. The first control region 36 is centrally located over the inconsistent area 22, and the second and third control regions 46, 48 may respectively comprise a pair of substantially concentric rings surrounding the centrally located first region 36. While the regions 36, 38, 40 are shown as being generally circular in the disclosed embodiment, a variety of other shapes are possible. Also, in other embodiments, the patch 30 may have only two control regions 36, 38, or may have more than three control regions 36, 38, 40.

The first control region 36 may exhibit favorable in-plane adhesive stresses. The second control region 38 may be referred to as a durability region and any disbond within this region between the patch 32 and the parent structure 24 may need to be evaluated and quantified in order to determine whether rework should be performed. The third control region 40, which may be dominated by in-plane shear and peeling moments, may affect the behavior of the entire structural bond between the patch 32 and parent structure 24.

Figure 3:
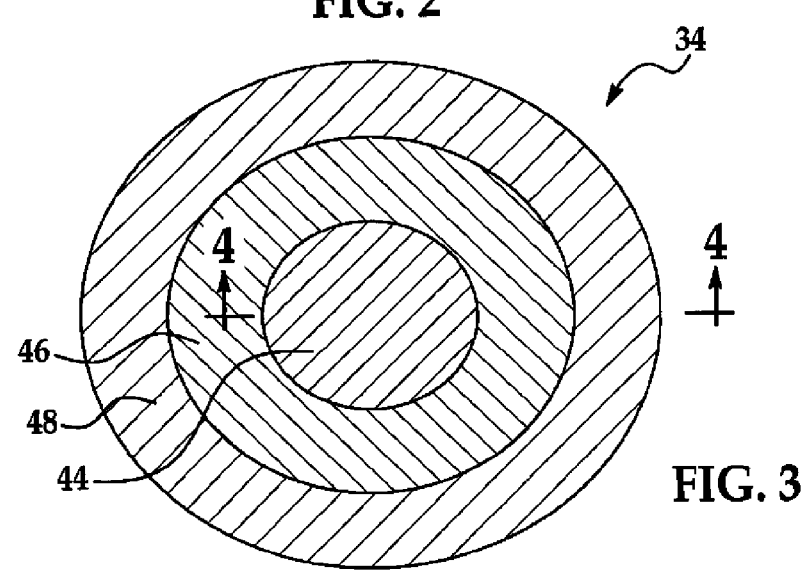
FIG. 3 is an illustration of a plan view of the adhesive layer shown in FIG. 2.
Figure 3A:
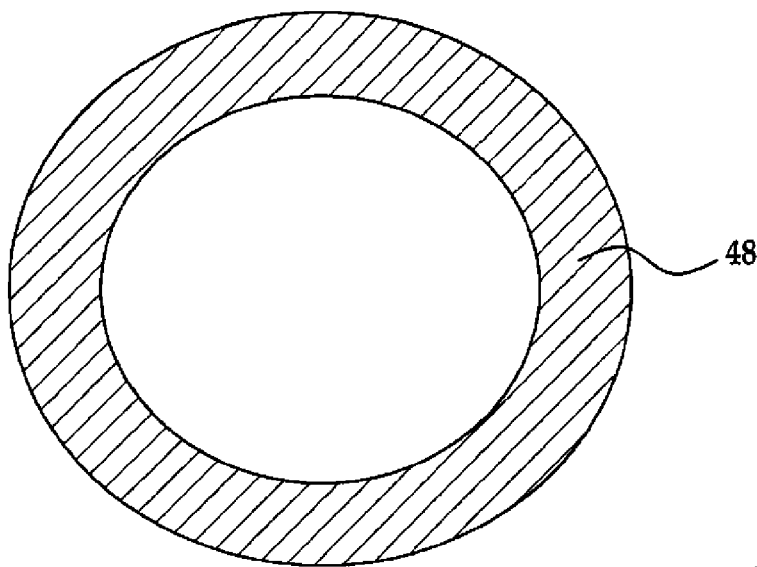
FIGS. 3a-3c are illustrations of plan views respectively of sections of the adhesive layer shown in FIG. 3.
Figure 3B:
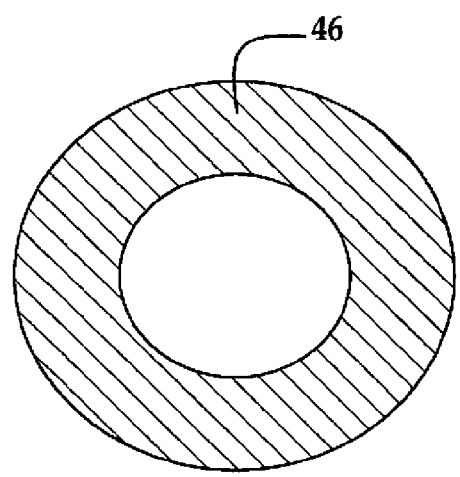
Figure 3C:
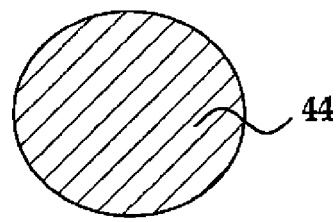
Figure 4:
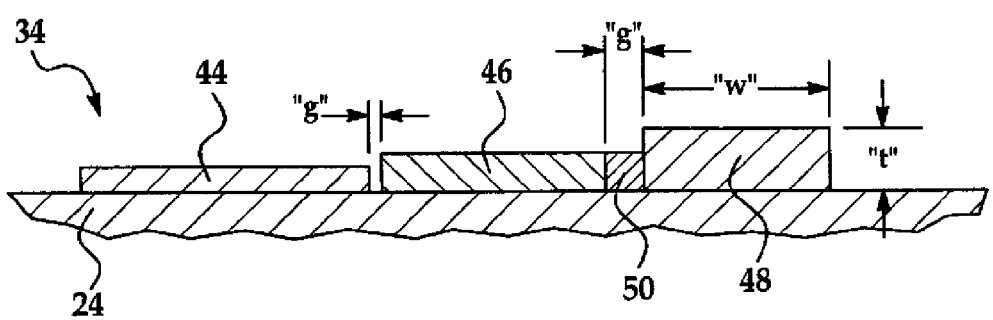
FIG. 4 is an illustration of a sectional view taken along the line 4-4 in FIG. 3.

Referring now particularly to FIGS. 2-4, the adhesive layer 34 may comprise a central, circular section 44 surrounded by concentric ring shaped sections 46 and 48. The size and shape of the adhesive sections 44, 46, 48 generally correspond to the first, second and third control regions 36, 38, 40 respectively of the rework patch 30. Each of the adhesive sections 44, 46, 48 may comprise one or more plies of a commercially available structural adhesive which is generally available in film or sheet form that may be cut to the desired shape. The adhesive sections 44, 46, 48 may also be formed from a commercially available structural adhesive paste. As previously noted, multiple plies (not shown) of the adhesive sheet material may be built up to form a desired thickness "t" for each of the adhesive sections 44, 46, 48. The strength of the bond may be tailored using the thickness "t" between patch 32 and structure 24. In some applications only a single ply of adhesive sheet material may be required, while in other applications, more than one ply may be necessary, depending on the application and the thickness of the adhesive sheet.

In one embodiment, circumferential gaps "g" may be formed between adhesive sections 44, 46, 48 to aid in arresting the growth of potential debonding between the laminate patch 32 and the composite structure 24. A filler 50 may be placed in one or both of the gaps "g" to aid in the arrestment.

The properties of each of the adhesive sections 44, 46, 48 may be tailored in a manner that affects the rate at which first, second and third control regions 36, 38, 40 of the bond joint 42 respectively release strain energy. Tailoring of each of the adhesive sections 44, 46, 48 may be achieved by altering the dimensions of the adhesive sections 44, 46, 48, such as thickness "t" or width "w", or by altering the form of the film, paste, scrim, etc., as well as by altering the structural properties of the adhesive layer, such as fracture toughness, peel or shear properties, or by providing the gap "g" between the adhesive sections 44, 46, 48. Fracture toughness may be described as the general resistance of a material to delaminate. Additionally, a spacer or filler 50 may be interposed between adhesive sections 44, 46, 48 to aid in arresting disbond growth. As used herein, "interlaminar fracture toughness" and "fracture toughness" generally refer to the resistance of a laminated material to delaminate. More particularly, these terms may refer to what is commonly known in the art of fracture mechanics as resistance to Mode I type delamination which results primarily from tensile forces acting to pull apart plies of, or open cracks in the laminate.

The use of the tailored adhesive sections 44, 46, 48 may result in a bonded rework patch 30 that is divided into multiple control regions 36, 38, 40 that respectively release strain energy at different rates. The first, second and third control regions 36, 38, 40 provide for a graceful reduction of transition loads between the patch 32 and the structure 24, which may not only allow prediction of a course of disbond extension, but can allow assessment of the condition of the rework patch 30 through simple visual inspection, or other non-destructive inspection techniques. Although three control regions 36, 38, 40 are shown and discussed, more or less than three control regions may be possible.

The first control region 36 of the patch 30 which overlies the inconsistent area 22 exhibits favorable in-plane stresses that may suppress the stress concentration around the boundary of a disbond of the bonded joint 42. The global adhesive stresses within the first control region 36 may reduce the strain energy release rate necessary for extension of a disbond under maximum load limits applied to the composite structure 24.

The characteristics of the rework patch 30 within the second control region 38 may result in the release of strain energy at a rate greater than that of the first control region 36. Any disbond that may occur in the bond joint 42 within the second control region 38 may be anticipated by a fatigue durability disbond curve (not shown) which defines the work input required to initiate disbond growth. The characteristics of the third control region 40 are selected such that the strain energy release rate within the third control region 40 is greater than that of the second control region 38 to discourage disbond initiation and growth, as well as in-plane shear and peeling moments.

Figure 5:
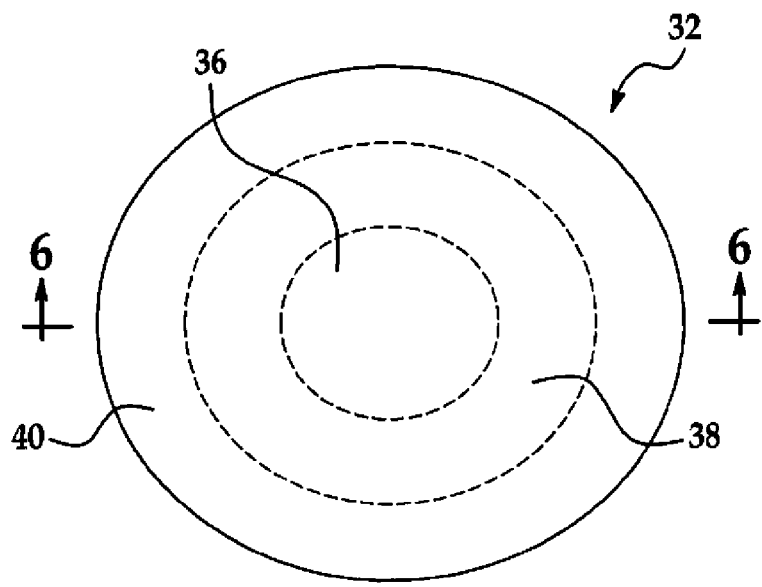
FIG. 5 is an illustration of a plan view of a composite laminate patch forming part of the rework patch shown in FIG. 1.
Figure 6:
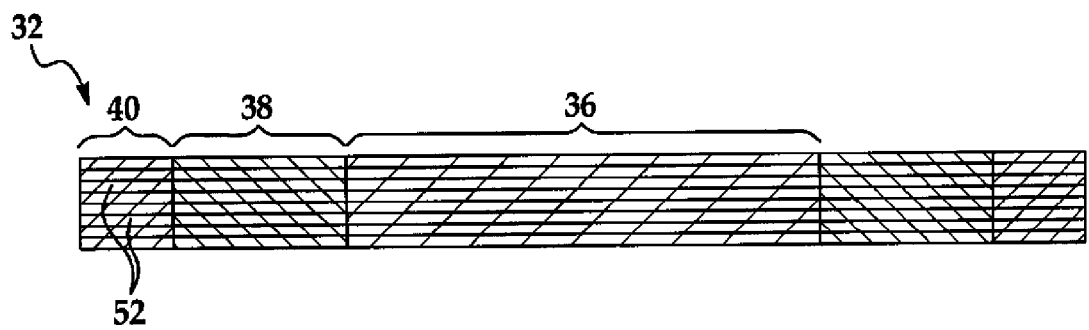
FIG. 6 is an illustration of a sectional view taken along the line 6-6 in FIG. 5.

Attention is now directed to FIGS. 5 and 6 which illustrate a laminated patch 32 comprising multiple plies 52 of fiber reinforced polymer in which the plies 52 may be tailored in order to aid in achieving first, second and third control regions 36, 38, 40 having the desired strain energy release rates. Strain energy release rate within the laminated patch 32 may be tailored within the control regions 36, 38, 40 by selecting and/or arranging the plies such that the plies in each of the regions 36, 38, 40 have different characteristics. In other words, each of the regions 36, 38, 40 may have ply characteristics that are unique to that region. Thus, for example, the plies in region 38 may have characteristics that are different from those in regions 36 or 40, and the plies in region 36 may have characteristics that are different than those in regions 38 and 40. As used herein, "characteristics" and "ply characteristics" refer to, without limitation: the type, size or quantity of fiber reinforcement in a ply; ply thickness; gaps between the plies; materials, elements or structures placed between the plies; the number of plies; the type or density of matrix used in the ply; the layup orientation (angle) of each ply and/or the sequence of ply orientations in a stack of the plies.

The strain energy release rate within one of more of the control regions 36, 38, 40 may be tailored by forming a scarf or tapered joint (not shown) between the patch 32 and the structure 24. The strain energy release rate may also be tailored by providing gaps (not shown) in certain areas between plies 52 in a manner that alter the mechanical properties of the laminated patch 32 in each of the control regions 36, 38, 40. Also, it may be possible to employ differing orientation sequences of the plies 52 in order to aid in achieving the defined control regions 36, 38, 40. Orientation refers to the layup angle or direction of reinforcing fibers in a ply, for example and without limitation, 0°, 30°, 60°, 90° and/or 0°, +45°, −45°, 90°.

In the example illustrated in FIGS. 5 and 6, the materials used in the plies 52 and/or the orientation sequences within the first control region 36 result in the highest rate of strain relief, while the selection of these materials and/or ply orientation sequences in second and third control regions 38 and 40 respectively result in intermediate and lowest rates of release of strain energy, respectively. In other embodiments, however, depending on the application, the third control region 40 may possess highest rate of strain energy relief, while the first control region 36 possesses the lowest rate of strain energy relief.

FIG. 7 illustrates an alternate embodiment of a rework patch 30a that may be used to rework an area of the composite structure 24 containing one or more inconsistencies 22 therein. The rework patch 30a includes a tapered laminate patch 32a comprising groups 59, 61, 63 of laminated composite plies each comprising, for example and without limitation, a fiber reinforced polymer, such as carbon fiber epoxy. The laminate patch 32a may have a generally circular configuration, similar to the laminate patch 32 shown in FIG. 5, including circularly shaped first, second and third regions 36, 38, 40 respectively having differing interlaminar fracture toughnesses. The first region 36 is comprised of all three groups of plies 59, 61, 63, while the second region 38 is comprised of ply groups 61, 63. The third region 40 is comprised of ply group 63. Ply groups 59, 61, 63 are concentrically disposed relative to each other, and around the inconsistency 22 in the composite structure 24.

Ply groups 59, 61, 63 have progressively larger widths or outer diameters $d_1$, $d_2$, $d_3$, respectively so that the cross section of the edge 55 of the laminate patch 32a has a taper angle θ relative to first and second faces 47, 49, respectively of the laminate patch 32a. Generally, the angle θ will depend upon the application, the widths or diameters $d_1$, $d_2$, $d_3$, of the groups 59, 61, 63 and the thickness of the groups 59, 61, 63. In this embodiment, the second face 49 of the laminate patch 32a is bonded to the structure 24.

Attention is now directed to FIG. 8 which illustrates one variation of the tapered patch 32a shown in FIG. 7, wherein each of the ply groups 59, 61, 63 comprises multiple plies 52, and includes tapered edges, 59a, 61a, 63a, each taped at a corresponding angle Φ relative to the first and second faces 47, 49, respectively. The taper angle Φ of the tapered edges 59a, 61a, 63a may be the same or different from each other, and may or may not be the same as the angle θ shown in FIG. 7. As in the case in the embodiment shown in FIG. 7, the laminate patch 32a shown in FIG. 8 has a first region 36 of interlaminar fracture toughness determined by all three ply groups 59, 61, 63, while the second region 38 has an interlaminar fracture toughness determined by ply groups 61 and 63. Finally, the interlaminar fracture toughness of the third region 40 is defined by ply group 63. The tapered edges 59a, 61a, 63a of the groups 59, 61, 63 are shown as being formed by a step-like arrangement of the individual plies 52, however, depending on the thickness of the plies 52, the outer edges of each of the plies 52 may be scarfed or tapered so that the tapered edges 59a, 61a, 63a are smooth tapers rather than being step-like tapers.

The interlaminar fracture toughness of the patch 30a within the regions 36, 38, 40 may be determined in part by the dimensions of the ply groups 59, 61, 63, as well as other characteristics of the ply groups 59, 61, 63, within the control regions 36, 38, 40, including but not limited to the type of fiber reinforcement, the number of plies, ply thickness and/or the type of matrix used in the plies, the use of gaps (not shown) between the plies 52, varying other mechanical properties of the plies 52, and using differing ply orientation sequences, all of which have been previously discussed in connection with the laminated patch 32 shown in FIGS. 5 and 6.

The second face 49 of the tapered laminate patch 32a shown in FIG. 8 is bonded to the composite structure 24 by a layer 34 of a structural adhesive forming a bond joint 42, similar to embodiments previously described. However, in the case of the embodiment shown in FIG. 8, the adhesive layer 34 is tapered, as illustrated in FIG. 9, wherein the outer perimeter 34a has a thickness $t_1$ which tapers inwardly to a central region 34b having a reduced thickness $t_2$. Tapering of the adhesive layer 34 results in tailoring of the rate of strain energy release in the bond joint 42 in a manner that compliments the regions 36, 38, 40 of interlaminar fracture toughness of the patch 32a. In other embodiments, the adhesive layer 34 may be tapered in other manners, including, without limitation, from the central region 34b outwardly to the outer perimeter 34a, from the central region 34b to only one side, or from one side of the perimeter 34a to the other side.

Figure 8A:
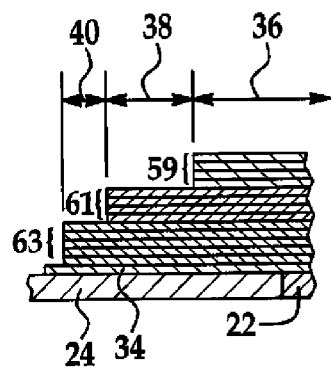
FIG. 8a is an illustration of a partial sectional view of an alternate embodiment of the patch.
Figure 9:
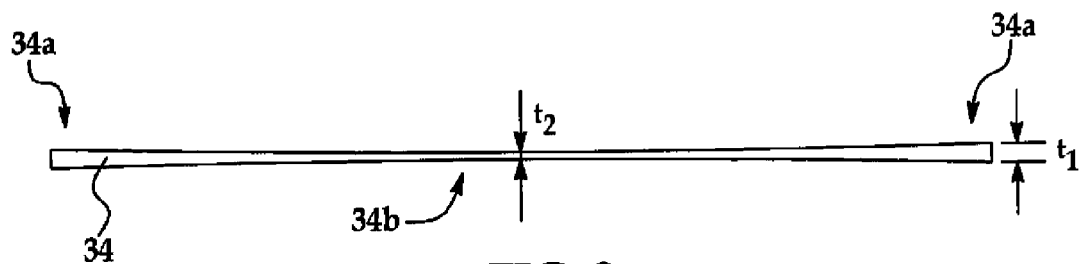
FIG. 9 is an illustration of a sectional view of the adhesive layer shown in FIG. 8.

Referring now to FIG. 8a, in some applications, some or all the plies 52a within each group 59, 61, 63 may have the same diameter so that rather than having tapered outer edges 59a, 61a, 63a as shown in FIG. 8, the edges of the plies in each group 59, 61, 63 shown in FIG. 8a extend substantially perpendicular to the plane of the plies 52.

Figure 10:
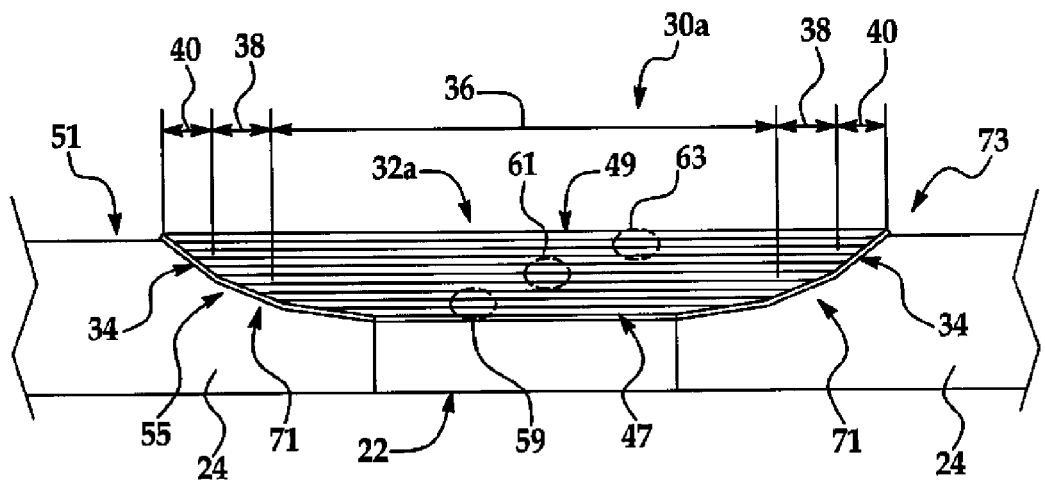
FIG. 10 is an illustration of a sectional view of an tapered rework patch bonded to a parent structure using a scarf joint.
Figure 11:
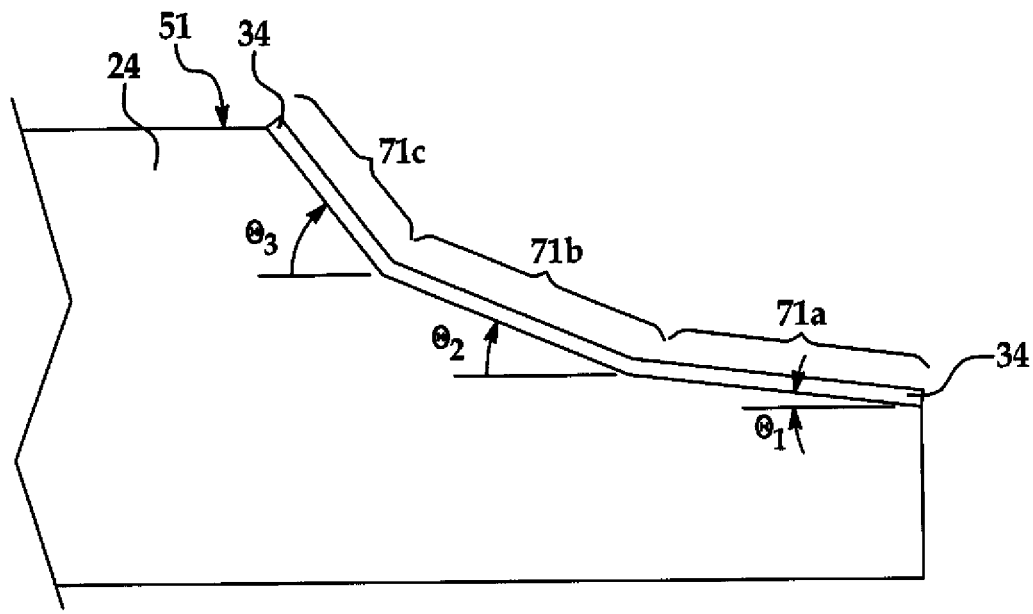
FIG. 11 is an illustration of a sectional view of a portion of the parent structure shown in FIG. 10, better showing an area of material removal forming the multiple tapers.

Referring now to FIGS. 10 and 11, the tapered laminate patch 32a shown in FIG. 8 may be configured and inverted to form a flush fitting rework patch 30a in which the second face 49 of the tapered laminate patch 32a extends substantially flush with the surface 51 of the composite structure 24, and the first face 47 overlies, and is substantially coextensive with the inconsistent area 22. The edge 55 of the laminate patch 32a overlaps a tapered edge 71 on the composite structure 24 surrounding the inconsistency 22 to form a bonded scarf joint 73. The tapered edge 71 is formed by removing material from the composite structure 24 surrounding the inconsistency 22. This material is removed so as to form three, substantially contiguous tapered surfaces 71a, 71b, 71c which respectively form scarf angles $\theta_1$, $\theta_2$, $\theta_3$. In this example, $\theta_2 > \theta_1$, and $\theta_3 > \theta_2$. Thus, tapered surface 71c is the steepest surface of the tapered edge 71, while tapered surface 71a is the most shallow surface of the tapered edge 71. The steepest scarf angle $\theta_3$ may have the least load carrying capability, while the shallowest scarf angle $\theta_1$ may have the highest load carrying ability. The use of a combination of multiple scarf angles $\theta_1$, $\theta_2$, $\theta_3$ vary the load carrying ability within the rework patch 30a which may aid in predicting the performance of the rework patch 30a over time. It should be noted here that although three tapered surfaces 71a, 71b, 71c are illustrated in the exemplary embodiment, more or less than three tapered surfaces are possible.

The edges 59a, 61a, 63a of the tapered patch 32a have respective taper angles $\Phi$ (FIG. 9) that substantially match the individual scarf angles $\theta_1$, $\theta_2$, $\theta_3$ of the tapered edge 71, and are respectively bonded to the tapered surfaces 71a, 71b, 71c of the edge 71. The tapered edge 55 of the rework patch 32a is bonded to the tapered edge 71 by a layer of adhesive 34 placed between the edge 55 and the edge 71 of the composite structure 24.

In one practical embodiment, the first region 36 of the laminate patch 32a may have an interlaminar fracture toughness of approximately 2.0 in-#/in$^2$ and a taper angle $\theta_1$ equivalent to a taper ratio of approximately 45:1. The taper ratio of 45:1 may reduce the peak probability of any extension of a crack from the first region 36 of the laminate patch 32a into the second and third regions 38, 40. The second region 38 of the laminate patch 32a may have a constant interlaminar fracture toughness of approximately 2.0 in-#/in$^2$ and a taper angle $\theta_2$ equivalent to a taper ratio of approximately 30:1, which may lead to further reductions in edge interlaminar peak stress, and an elevation of total fatigue threshold strain energy release rate, thus reducing or eliminating fatigue crack growth rate within the second region 38 of the laminate patch 32a. The third region 40 of the laminate patch 32a may have an interlaminar fracture toughness of approximately 2.0 in/#/in$^2$ and a taper angle equivalent to approximately 20:1. The specific taper ratios mentioned above are only exemplary, and other ratios are possible, depending on the application.

Figure 12:
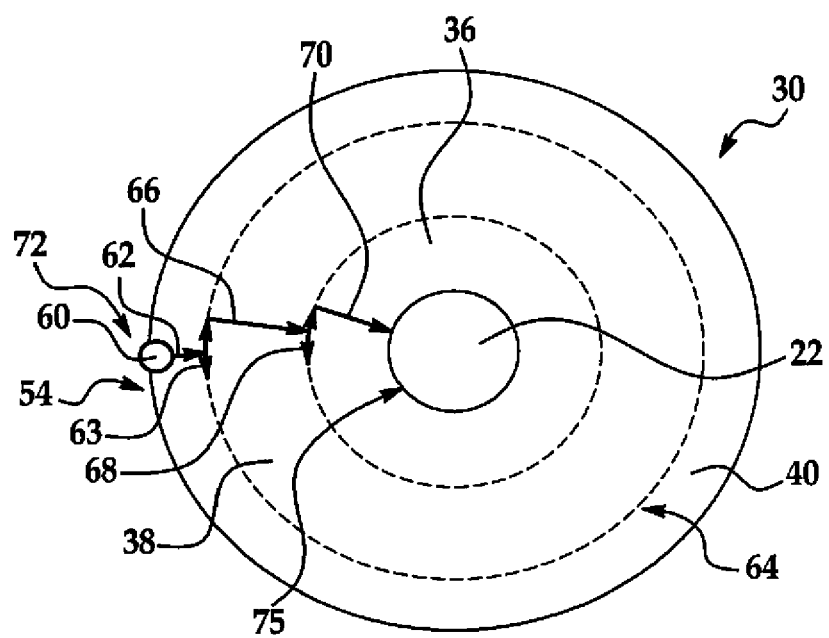
FIG. 12 is an illustration of a plan view of the tapered rework patch shown in FIG. 7, and illustrating a typical propagation path of a debonding.

FIG. 12 illustrates the manner in which a disbond beginning at outer edge 60 of the third control region 40 and growing inwardly, may be arrested. The disbond beginning at edge 60 may be illustrated in this scenario as growing directly inward, as shown at 62 until the boundary is reached between control regions 38 and 40. As a result of the difference in materials in control regions 36, 38, 40, and/or the presence of a gap "g" or filler 50 (FIG. 5), and/or the difference in the adhesive properties of the sections 44, 46, 48 of the adhesive layer 34 (FIG. 2), the disbond is arrested and may move circumferentially around 63 the boundary 64 of the third control region 40. Another scenario may have a disbond progressing from the third region 40 and into the second control region 38, and progressing inwardly toward the first control region 36, as indicated by the numeral 66. When the progression of the disbond reaches the boundary 68 between control regions 36 and 38, it is arrested and may move circumferentially around the boundary 68.

Referring concurrently to FIGS. 12 and 13, as the disbond 72 (FIG. 13) moves inwardly from the beginning point 60, the outer edge 54 of the rework patch may peel upwardly thereby cracking overlying paint 69 at 77 which provides a visual indication of disbond initiation and/or growth within the third control region 40. This visual indication of a disbond may terminate at the boundary 64 between control regions 38 and 40.

As shown in FIG. 14, if the disbond 72 continues into the second control region 40 toward the second boundary 68, the patch 30 in the area of the control regions 38 and 40 may peel upwardly, thereby further cracking overlying paint 69 at 77 to provide a visual indication that the disbond has progressed into or through the second control region 40. FIG. 15 illustrates the disbond having been progressed up to the boundary 75 of the inconsistency 22. At this point, the areas of the patch 30 and all three control regions 36, 38, 40 may peel upwardly to further crack overlying paint 69 at 77, thereby providing a still more obvious visual indication that the disbond has advanced to a point where the rework patch 30 may need further attention. It should be noted here that while visual inspection of the paint 69 may detect the paint cracking at 77, other well known non-destructive inspection techniques may be used to detect cracking of the paint 69 where the cracking may not be visible to the naked eye, or to otherwise detect peeling of the patch 30. Thus, from the foregoing, it is apparent that the control regions 36, 28, 40 of the rework patch 30 provide a means of allowing nondestructive inspection of the condition of the bond between the patch 30 and the structure 24.

Figure 16:
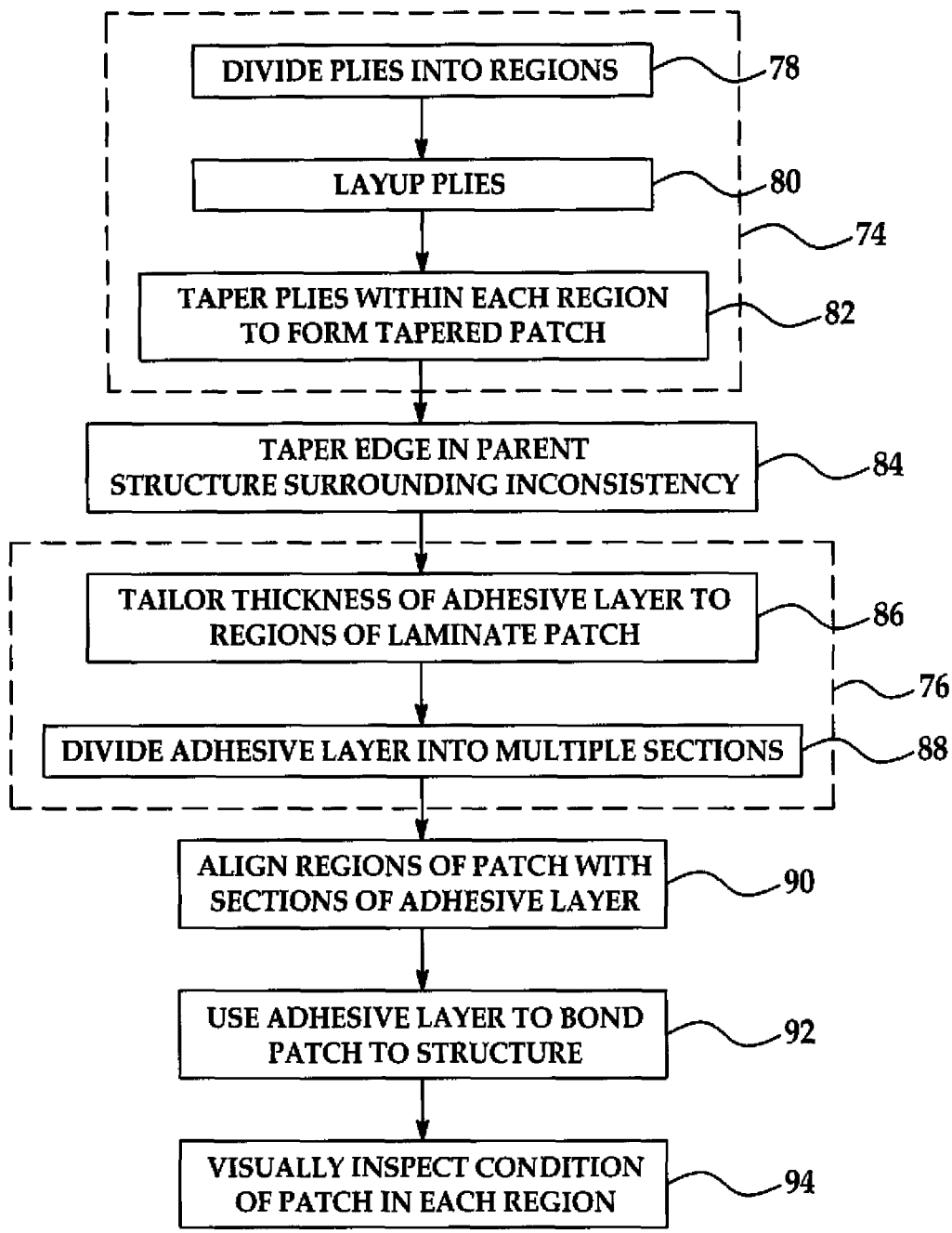
FIG. 16 is an illustration of a flow diagram of a method for reworking an inconsistent area of a composite structure using a tapered rework patch.

Attention is now directed to FIG. 16, which broadly illustrates a method for reworking an area of a composite structure 24 containing an inconsistency 22, using the tapered rework patch 32a described above. The tapered patch 32a is formed by a series of steps 74 that begin at 78 with dividing plies 52 into multiple regions 36, 38, 40, which may comprise multiple ply groups 59, 61, 63 respectively, and then laying up plies at 80. Optionally, the pies 52 within each of the groups 59, 61, 63 may be tapered, as shown at step 82. At 84, an edge 71 in the parent composite structure 24 surrounding the inconsistency 22 may be tapered. This tapering may comprise forming one or more of the tapered surfaces 71a, 71b, 71c having differing scarf angles $\theta_1$, $\theta_2$, $\theta_3$.

The layer 34 of adhesive is formed by steps 76 beginning with tailoring the thickness of the adhesive layer 34 to the regions 36, 38, 40 of the tapered laminate patch 32a, as shown at step 86. At 88, the adhesive layer 34 may be divided into multiple sections 44, 46, 48 that respectively release strain energy at differing rates, or alternatively, may be tailored by tapering the adhesive layer 34, as shown in FIG. 9.

Next, at step 90, the regions 36, 38, 40 of the tapered rework patch 32a are aligned with the adhesive layer 34. As shown at 92, the adhesive layer 34 is used to bond the tapered rework patch 32a to the composite structure 24. Finally, at 94, the condition of a rework patch 30 may be periodically visually inspected to determine the condition of the patch 30a in each of the regions 36, 38, 40.

Figure 17:
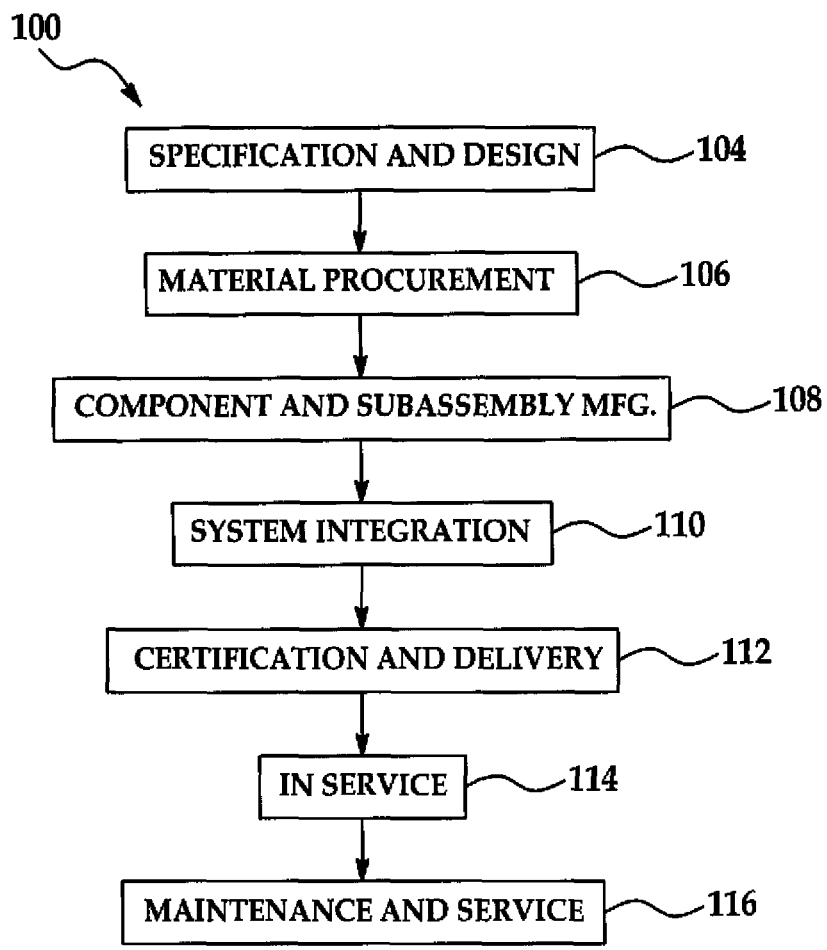
FIG. 17 is an illustration of a flow diagram of aircraft production and service methodology.
Figure 18:
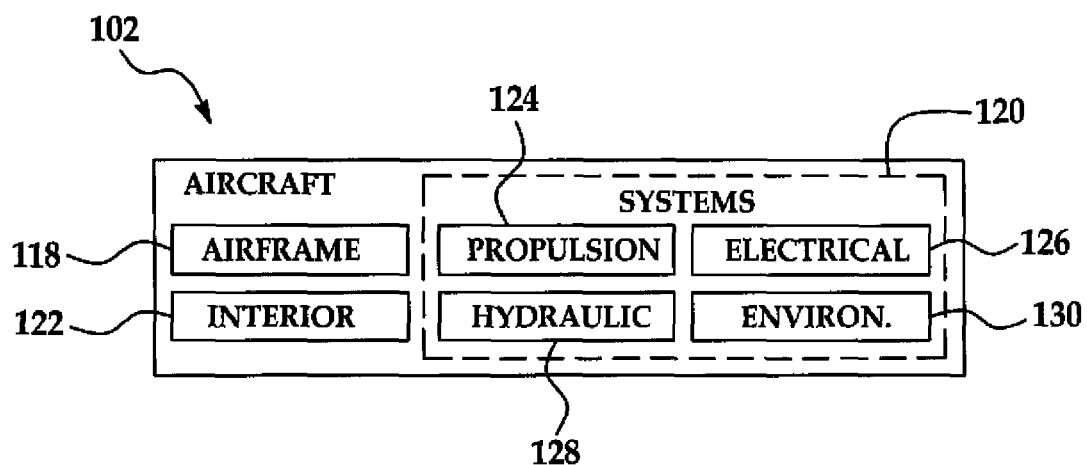
FIG. 18 is an illustration of a block diagram of an aircraft.

Embodiments of the disclosure may find use in a variety of potential applications, particularly in the transportation industry, including for example, aerospace, marine and automotive applications. Thus, referring now to FIGS. 17 and 18, embodiments of the disclosure may be used in the context of an aircraft manufacturing and service method 100 as shown in FIG. 17 and an aircraft 102 as shown in FIG. 18. During pre-production, exemplary method 100 may include specification and design 104 of the aircraft 102 and material procurement 106. The rework, tapered patches 30a may be specified and designed as part of the specification and design 104 of the aircraft 102, and procured as part of the procurement process 106. During production, component and subassembly manufacturing 108 and system integration 110 of the aircraft 102 takes place. The tapered patches 30a may be used during production to rework inconsistencies that occur during the manufacturing 108 and/or system integration 110. Thereafter, the aircraft 102 may go through certification and delivery 112 in order to be placed in service 114. The tapered patches 30a may be used to rework inconsistencies in order to achieve certification of the aircraft 102 and/or to satisfy delivery requirements. While in service by a customer, the aircraft 102 is scheduled for routine maintenance and service 116 (which may also include modification, reconfiguration, refurbishment, and so on). The tapered patches 30a may be used while the aircraft 102 is in service to rework areas of the aircraft 102 that may develop inconsistencies while in service, or as part of a periodic maintenance routine.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 102 produced by exemplary method 100 may include an airframe 118 with a plurality of systems 120 and an interior 122. The tapered patches 30a may be used to rework inconsistencies in the airframe 118. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the marine and automotive industries.

Systems and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A patch for reworking an inconsistent area in a composite structure, comprising:
a composite laminate patch adapted to cover the inconsistent area and including a plurality of composite plies having a tapered cross section, the composite laminate patch including at least: a first bond joint control region, and a second bond joint control region configured substantially surrounding the first bond joint control region and comprising a differing fracture toughness than the first bond joint control region, such that a first strain energy release rate of the first bond joint control region is distinct from a second strain energy release rate of the second bond joint control region, and such that the first bond joint control region and the second bond joint control region each comprise different resistances to delamination, each bond joint control region configured to present an indication of a condition of the composite laminate patch and comprising a corresponding first ply that is bonded, by a corresponding tailored adhesive, to a corresponding surface comprising at least one of: a second ply, and the composite structure.

2. The patch of claim 1, wherein the composite plies include at least first and second groups of plies respectively defining the first and second regions.

3. The patch of claim 2, wherein edges of the plies in each of the first and second groups form the tapered cross section.

4. The patch of claim 1, wherein:
the laminate patch includes a third region having a third region fracture toughness different than the fracture toughnesses of the first and second regions, and
the composite plies include at least first, second and third groups of plies respectively defining the first, second and third regions.

5. The patch of claim 1, wherein the first and second regions respectively have generally circular outer perimeters and are substantially concentric.

6. The patch of claim 1, wherein the tailored adhesive has a thickness that tapers from the first region to the second region.

7. The patch of claim 1, wherein:
the laminate patch includes first and second faces, and tapers outwardly from the first face to the second face, and
the second face is bonded to the composite structure by the tailored adhesive.

8. The patch of claim 1, further comprising the tapered cross section being bonded to the composite structure by the tailored adhesive.

9. The patch of claim 1, wherein the tailored adhesive includes at least first and second regions respectively bonding the first and second regions of the laminate patch to the composite structure, the first and second regions of the tailored adhesive having differing properties for releasing strain energy around the inconsistent area at different rates.

10. A patch for reworking an inconsistent area in a composite structure, comprising:

a composite laminate patch adapted to cover the inconsistent area and including at least first and second groups of composite laminate plies, the first and second groups of plies respectively defining a first control region substantially surrounded by a second control region, each control region comprising differing interlaminar fracture toughnesses, the first group of plies having a first width, the second group of plies having a second width different than the first width; and a layer of adhesive for bonding the composite laminate patch to the composite structure, the layer comprising a thickness of the layer tailored across the layer such that a rate of strain energy release in a bond joint between the layer and the composite laminate patch compliments the respective interlaminar fracture toughness of each control region.

11. The patch of claim 10, wherein:
the first width is less than second width,
the first group of plies has a first face, and
the second group of plies has a second face opposite the first face and bonded to the composite structure by the adhesive layer.

12. The patch of claim 10, wherein each of the first and second groups of plies include tapered edges.

13. The patch of claim 10, wherein:
the plies in the first and second groups each include reinforcing fibers having a fiber orientation and a layup orientation sequence, and
the layup sequence of the plies in the first group is different than the layup sequence of the plies in the second group.

14. The patch of claim 10, wherein a first number of plies in the first group is different than a second number of plies in the second group.

15. The patch of claim 10, wherein a first thickness of the plies in the first group is different than a second thickness of the plies in the second group.

16. The patch of claim 10, further comprising the thickness tapering from outer edges of the layer to a central area of the layer.

17. A bonded rework of an inconsistent area in a composite structure, comprising:
a tapered edge on the composite structure surrounding the inconsistent area, the tapered edge comprising a first tapered surface and a second tapered surface respectively having a first scarf angle and a second scarf angle, the second scarf angle being steeper than the first scarf angle, the first scarf angle configured to carry a higher load than the second scarf angle and aid a prediction of performance of the bonded rework over time; and, a tapered composite laminate patch covering the inconsistent area, the patch comprising an edge comprising a first tapered portion and a second tapered portion respectively bonded to the first and second tapered surfaces and forming a scarf joint between the composite structure and the composite tapered laminate patch, the first tapered portion corresponding to a first boundary of a first control region, the first control region configured to reduce a peak probability of a crack in the first region from extending beyond the first control region, the second tapered portion corresponding to a second boundary of a second control region, the second control region configured to elevate a total fatigue threshold strain energy release rate of the bonded rework; and an adhesive layer configured to bond the tapered composite laminate patch to the tapered edge on the composite structure, the adhesive layer being sectioned corresponding to each control region of the tapered composite laminate patch such that each section of the adhesive layer comprises a respective tailored rate of release strain energy.

18. The rework of claim 17, wherein:
the tapered edge on the composite structure includes a third tapered surface having a third scarf angle, and
the edge of the tapered patch includes a third portion bonded to the third tapered surface.

19. The rework of claim 17, wherein:
the tapered laminate patch includes at least first and second groups of composite laminate plies respectively defining first and second regions having differing interlaminar fracture toughnesses.

20. A patch for reworking an inconsistent area in a composite aircraft structure, comprising:
a composite laminate patch adapted to cover the inconsistent area and including first, second and third groups of composite plies respectively defining first, second and third regions of differing fracture toughness, the first, second and third groups of composite plies having edges respectively tapered at first, second and third angles, the first region configured to exhibit favorable in-plane adhesive stresses, the second region substantially contiguous and concentric about the first region and configured to indicate a need for reworking the inconsistent area, the third region substantially contiguous and concentric about the second region and configured for domination by in-plane shear and peeling moments;

a first surface, a second surface, and a third surface formed on an edge of the composite structure surrounding the inconsistent area and respectively having scarf angles generally matching the first, second and third angles; and, a layer of adhesive configured to bond the edges of the plies to the first surface, the second surface, and the third surface of the edge on the composite structure; the layer comprising a first adhesive section, a second adhesive section, and a third adhesive section, corresponding to the first region, the second region, and the third region respectively, and each adhesive section tailored to at least one of: a desired thickness between the patch and the composite aircraft structure, a desired rate of release strain energy, and a desired fracture toughness.

* * * * *